United States Patent
Ban et al.

(10) Patent No.: US 7,175,078 B2
(45) Date of Patent: Feb. 13, 2007

(54) PERSONAL PORTABLE STORAGE MEDIUM

(75) Inventors: Amir Ban, Ramat Hasharon (IL); Udi Weinstein, Ramat Hasharon (IL)

(73) Assignee: msystems Ltd., Kfar Saba (IL)

( * ) Notice: Subject to any disclaimer, the term of this patent is extended or adjusted under 35 U.S.C. 154(b) by 595 days.

(21) Appl. No.: 10/398,647

(22) PCT Filed: Mar. 11, 2003

(86) PCT No.: PCT/IL03/00197

§ 371 (c)(1),
(2), (4) Date: Nov. 24, 2003

(87) PCT Pub. No.: WO03/077053

PCT Pub. Date: Sep. 18, 2003

(65) Prior Publication Data

US 2004/0073787 A1 Apr. 15, 2004

Related U.S. Application Data

(60) Provisional application No. 60/363,571, filed on Mar. 13, 2002.

(51) Int. Cl.
*G06K 5/00* (2006.01)
(52) U.S. Cl. .................. 235/380; 235/382; 235/382.5
(58) Field of Classification Search ............... 235/380, 235/382, 382.5
See application file for complete search history.

(56) References Cited

U.S. PATENT DOCUMENTS

| | | | | |
|---|---|---|---|---|
| 5,497,411 A | * | 3/1996 | Pellerin | 455/411 |
| 5,590,199 A | * | 12/1996 | Krajewski et al. | 713/159 |
| 5,878,138 A | * | 3/1999 | Yacobi | 705/69 |
| 6,263,330 B1 | * | 7/2001 | Bessette | 707/4 |
| 6,572,015 B1 | * | 6/2003 | Norton | 235/382 |
| 6,944,766 B2 | * | 9/2005 | Hamada | 713/182 |
| 2005/0257254 A1 | * | 11/2005 | Hamada | 726/5 |

* cited by examiner

*Primary Examiner*—Steven S. Paik
(74) *Attorney, Agent, or Firm*—Mark M. Friedman

(57) ABSTRACT

A method to personalize a computer environment of a computer system. The method includes storing at least a portion of a user profile in a portable storage medium, logging onto the computer system using a user identification and validating the user identification from a relevant user list by the computer system. The method also includes retrieving the portion from the portable storage medium and at least partially configuring the computer environment of the computer system according to the retrieved portion, by the computer system. A method is also included to provide personalized services to a user. This method includes storing at least a portion of a user profile in a portable storage medium and retrieving the portion from the portable storage medium by a web server. This method additionally includes at least partially configuring an Internet service according to the retrieved portion by said web server.

39 Claims, 3 Drawing Sheets

PERSONAL PORTABLE STORAGE MEDIUM

This application is 371 of PCT/IL03/00197 filed Mar. 11, 2003 which claims benefit of 60/363,571 filed Mar. 13, 2002.

FIELD AND BACKGROUND OF THE INVENTION

The present invention relates to roaming user profiles and, in particular, it concerns roaming user profiles stored in portable storage media.

Current operating systems for personal computers (PC's) are often able to recognize several users using the same computing environment. Systems like Microsoft's Windows 2000, for example, can manage more than one user on a single PC. A recognized user can log on to the operating system by keying in a username and a password. The system maintains a separate environment for each user such that different users may work on the same computer, each maintaining his or her own personality and without interfering with other users. The operating system maintains a "user profile" for each user. Typically, the user profile stores and defines the preferences, settings and documents of a user. These may include, the on-screen desktop appearance, color scheme, wallpaper, the icons, their shape and location on the desktop, the choices in the desktop menus, settings and preferences for using web browsers, word processors, email servers and other tools. In addition, files including, for example: email archives, worksheets, presentations, audio and video files are often part of the user profile, and this is preferable especially if these files should be hidden from other users. User profiles are usually organized as a single directory tree for each user. In Windows operating systems, the user profile of <username> is typically found in path C:\Documents and Settings\<username>. It should be noted that most files on a computer disk do not belong to any particular user. In particular, the operating system and executable application files are global and available to all users. Thus, for example, a Microsoft Word document, the Microsoft Word icon and the preferences for using Microsoft Word are typically part of a user profile, but the Microsoft Word application itself is not. Typically, user profiles occupy only a small part of a computer disk content.

In a network environment, several computers are interconnected and managed by at least one server. The connection between computers and the server may be via a local area network (LAN) cable, or via a dial-up networking connection. In a network environment, a type of user profile called a roaming user profile can be created and maintained. A roaming user profile is a user profile that is resident on the network server, and is accessible from any computer in the network. In the network environment, the list of known users is defined on the server, allowing any user to log in with a username and a password from any computer in the network. If the user has a roaming user profile, the computer to which he or she has logged in assumes the user's personality as defined in the roaming user profile. Any changes to the profile, such as adding a new document, are stored in the roaming profile and so are available when the same user logs on to the network, possibly from a different computer. Provision is often made for a computer being temporarily offline by mirroring the user profile on the local disk and synchronizing between the profile and its local mirror copy. For example, roaming user profiles are currently available under a Windows NT or a Windows 2000 network environment. A domain is a group of computers in which a username is recognized. In other words, a username belongs to at least one domain. On a computer, a username can belong to the local domain, and so be recognized locally only, or to a network domain, in which case the username is recognized on all computers of the network. The list of known usernames and passwords is maintained on the domain's network server, and parts of the list are mirrored on computers, so that users can log on when the local computer is temporarily offline.

A related concept is the Virtual Home Environment (VHE) envisioned in mobile computing. In mobile computing, the VHE is a concept whereby a network that is supporting mobile users provides the mobile users the same computing environment on the road that the mobile users have in their home or corporate computing environment. VHE is part of IMT-2000 and the Universal Mobile Telecommunication Service (UMTS). With VHE, a network, referred to as a foreign network, emulates the behavior of the user's home network and the user has the same services as he or she is accustomed to at home.

Many sites on the World Wide Web provide personalized services, and these sites require user identification to provide the personalized services. A database of user preferences and user data is maintained on the web site's web server, a concept analogous to the PC's user profile. Often, a returning user is recognized by a small file, called a "cookie", that is stored in the user's local disk. The "cookie" is searched for and found by the web site's client software running on the user's web browser. Cookies are usually stored as part of the user profile and so are automatically able to "roam" between computers when the user profile is roaming.

Microsoft's .NET platform deals with many aspects of Web personal services. In particular .NET Passport is an initiative to provide trusted and universal authentication of users who use Internet personalized services. .NET My Services is a development platform for providing services to users over the web, for example: to make the user's music preferences available, to receive notification about availability of concert tickets, to buy those tickets, and to mark the concert in the user's calendar.

The need to provide a personalized computing environment, irrespective of the computer, is recognized and partially provided for, and vision and plans exist to expand it universally. However, all such provisions call for computers to be networked and online, be it through a LAN, the Internet or mobile telephony. Furthermore, a universal roaming profile depends on the home network exporting the user profile data over the Internet. Therefore, a user traveling between office and home will be able to continue working at home on a document started in office only if the user is online and logged on to the office network. Therefore, a portable PC cannot share user profile data unless the PC is connected to the network by modem. Additionally, a user may often need to work on a foreign network. Examples of foreign networks are: Internet cafes, computers in public places such as hotels and airports, corporate networks during business calls, and networks of institutions providing services, such as banks and medical facilities. A foreign network's ability to provide a visitor's data is dependent on the willingness of his or her home network to provide that data over the Internet, which is possible but requires logistics and poses a security risk.

Personalized data services are provided by web sites, for example: on the Web email services of Yahoo! and Microsoft hotmail. However, these services depend on the respective web services storing this data on their web server and providing the data over the Internet. From the viewpoint of user privacy this solution is not altogether satisfactory, and the absence of the web site's cookie on a foreign computer is problematic. Moreover, the legality of the cookie practice has been called into question.

Microsoft's .NET platform's Passport service assumes that personalized data will be stored in a Microsoft server. Again, from the viewpoint of user privacy this solution is not altogether satisfactory.

There is therefore a need for a solution to provide personal data and a personalized computer environment to a user that is not dependent on online networking, and furthermore provides a user tangible ownership and control over his or her personal data.

SUMMARY OF THE INVENTION

The present invention is a method to provide personalized services to a user using a roaming user profile stored in a portable storage medium.

According to the teachings of the present invention there is also provided, a method to personalize a computer environment of a computer system comprising the steps of: (a) storing at least a portion of a user profile in a portable storage medium; (b) logging onto the computer system using a user identification; (c) validating the user identification from a relevant user list, by the computer system; (d) retrieving the portion from the portable storage medium, by the computer system; and (e) at least partially configuring the computer environment of the computer system of the portion, by the computer system.

According to a further feature of the present invention, the relevant user list is stored in the computer system.

According to a further feature of the present invention, the relevant user list is stored in the portable storage medium.

According to a further feature of the present invention, there is also provided the step of: (f) the computer system knowing that the relevant user list is stored in the portable storage medium.

According to a further feature of the present invention, there is also provided the step of: (f) the computer system recognizing the portable storage medium as a domain and a network node of the computer system.

According to a further feature of the present invention, there is also provided the step of: (f) the computer system knowing that the portion is stored in the portable storage medium.

According to a further feature of the present invention, there is also provided the steps of: (f) creating a copy of the portion in a local storage facility of the computer system, by the computer system; and (g) synchronizing the copy of the portion which is stored in the local storage facility with the portion which is stored in the portable storage medium.

According to a further feature: of the present invention, the step of synchronizing is performed during at least one of a logging on to the computer system and a logging off from the computer system.

According to a further feature of the present invention, there is also provided the step of: (f) preventing at least a part of a copy of the portion remaining available to the computer system after the portable storage medium and the computer system are operationally disconnected, by at least one of the computer system and the portable storage medium.

According to a further feature of the present invention, there is also provided the step of: (f) the computer system validating a certificate file which is stored in the portable storage medium to grant use of the computer system.

According to a further feature of the present invention, the certificate file expires after a predetermined time period.

According to a further feature of the present invention, the certificate file expires after a predetermined number of logins.

According to a further feature of the present invention, the certificate file expires after a prepaid cash balance is exhausted.

According to the teachings of the present invention there is also provided, a computer system comprising: (a) a portable storage medium having at least a portion of a user profile stored therein; and (b) a processor which is configured to: (i) validating a user identification from a relevant user list; (ii) retrieve the portion from the portable storage medium; and (iii) update a computer environment associated with the processor of the portion.

According to a further feature of the present invention the portable storage medium is configured to be reversibly operationally connected to the processor.

According to a further feature of the present invention the processor has a local storage facility; and wherein the relevant user list is stored in the local storage facility.

According to a further feature of the present invention the relevant user list is stored in the portable storage medium.

According to a further feature of the present invention the portable storage medium is further configured, such that, the processor knows that the user list is stored in the portable storage medium.

According to a further feature of the present invention the portable storage medium is configured, such that, the processor recognizes the portable storage medium as a domain and a network node of the processor.

According to a further feature of the present invention the portable storage medium is further configured, such that, the processor knows that the portion is stored in the portable storage medium.

According to a further feature of the present invention the processor has a local storage facility; wherein the processor is further configured to create a copy of the portion in the local storage facility; and wherein at least one of the processor and the portable storage medium is configured to synchronize the copy of the portion which is stored in the local storage facility with the portion which is stored in the portable storage medium.

According to a further feature of the present invention at least one of the processor and the portable storage medium is further configured to synchronize the copy of the portion which is stored in the local storage facility with the portion which is stored in the portable storage medium during at least one of a logging on to the processor and a logging off from the processor.

According to a further feature of the present invention at least one of the processor and the portable storage medium is further configured to prevent at least a part of a copy of the portion remaining available to the processor after the portable storage medium and the processor are operationally disconnected.

According to a further feature of the present invention the portable storage medium has a certificate file therein; and wherein the processor is further configured to validate the certificate file to grant use of the computer system.

According to a further feature of the present invention the certificate file expires after a predetermined time period.

According to a further feature of the present invention the certificate file expires after a predetermined number of logins.

According to a further feature of the present invention the certificate file expires after a prepaid cash balance is exhausted.

According to the teachings of the present invention there is also provided, a method to provide personalized services to a user comprising the steps of: (a) storing at least a portion of a user profile in a portable storage medium; (b) retrieving the portion from the portable storage medium by the web server; and (c) at least partially configuring an Internet service of the portion by the web server.

According to a further feature of the present invention, there is also provided the steps of: (d) creating a copy of the portion in a local storage facility of the web server, by the web server; and (e) synchronizing the copy of the portion which is stored in the local storage facility with the portion which is stored in the portable storage medium.

According to a further feature of the present invention, the step of synchronizing is performed during at least one of a logging on to the web server and a logging off from the web server.

According to a further feature of the present invention, there is also provided the step of: (d) preventing at least a part of a copy of the portion remaining available to the web server after the portable storage medium and the web server are operationally disconnected, by at least one of the web server and the portable storage medium.

According to a further feature of the present invention, there is also provided the step of: (d) the web server validating a certificate file which is stored in the portable storage medium to grant use of the web server.

According to a further feature of the present invention, the certificate file expires after a predetermined time period.

According to a further feature of the present invention, the certificate file expires after a predetermined number of logins.

According to a further feature of the present invention, the certificate file expires after a prepaid cash balance is exhausted.

According to the teachings of the present invention there is also provided, a system to provide personalized services to a user comprising: (a) a portable storage medium having at least a portion of a user profile stored therein; and (b) a web server which is configured to retrieve the portion to personalize an Internet service.

According to a further feature of the present invention, the web server has a local storage facility; wherein the web server is further configured to create a copy of the portion in the local storage facility; and wherein at least one of the web server and the portable storage medium is configured to synchronize the copy of the portion which is stored in the local storage facility with the portion which is stored in the portable storage medium.

According to a further feature of the present invention, at least one of the web server and the portable storage medium is further configured to synchronize the copy of the portion which is stored in the local storage facility with the portion which is stored in the portable storage medium during at least one of a logging on to the web server and a logging off from the web server.

According to a further feature of the present invention, at least one of the web server and the portable storage medium is further configured to prevent at least a part of a copy of the portion remaining available to the web server after the portable storage medium and the web server are operationally disconnected.

According to a further feature of the present invention, the portable storage medium has a certificate file therein; and wherein the web server is further configured to validate the certificate file to grant use of the web server.

According to a further feature of the present invention, the certificate file expires after a predetermined time period.

According to a further feature of the present invention, the certificate file expires after a predetermined number of logins.

According to a further feature of the present invention, the certificate file expires after a prepaid cash balance is exhausted.

According to the teachings of the present invention there is also provided, a method for restricting personalizing a computer environment of a computer system comprising the steps of: (a) operationally connecting a portable storage medium having a user profile thereon to the computer system; and (b) preventing portable storage medium login to the computer system, by the computer system.

According to a further feature of the present invention, the step of preventing is performed after a failed validation attempt of a certificate file which is stored in the portable storage medium.

According to a further feature of the present invention, the step of preventing is performed after a failed validation attempt of authorized users.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a method to provide personalized services to a user using a roaming user profile stored in a portable storage medium.

The principles and operation of the method to provide personalized services to a user using a roaming user profile stored in a portable storage medium according to the present invention may be better understood with reference to the drawings and the accompanying description.

By way of introduction, personalized services such as updating a computer environment of a computer system or personalizing a Internet service which is run by a web server rely on user specific data or user profiles. According to the present invention, instead of storing the user profiles on the computer system or the web server, the user profile is stored in a portable storage medium. The portable storage medium is defined as portable in that the storage medium is not tied to a particular computer system but is sharable among many computer systems, which may or may not be linked. Typically, the portable storage medium is retained by the user and is moved from computer to computer as needed. Therefore, a user is not dependent on online networking. Furthermore, the user has tangible ownership and control over his or her personal data.

Recently, convenient pocketsize storage media have become commercially available. For example, Universal Serial Bus (USB) Flash disks are commercially available. One such Flash disk is the DiskOnKey®, available from M-Systems Ltd. of Kfar Saba, Israel. These pocket size storage media typically feature a USB connector that is universally connectable in current PC architecture. Furthermore, the pocket size storage media are typically plug-and-play on all state-of-the-art operating systems and their insertion into a computer needs no installation or preparation. The capacity of each pocket size storage medium is typically up to 256 megabytes. This capacity is more than adequate for storing a user profile, which includes preferences, settings and documents of a typical user.

There are two main scenarios relating to the use of a user profile that is stored in a portable storage medium. The first scenario is that in which a user is using a portable storage medium having a user profile stored therein with computers that belong to the user, such as, the user's office desktop, home desktop, notebook, Personal Digital Assistant (PDA) and car PC. It is assumed that the user is known to each of these computers by username and password (optional). The second scenario is that in which a user is using a portable storage medium having a user profile stored therein with a foreign computer. The problem encountered in the second scenario is that the user may be unknown to the foreign computing environment.

Figure 1:
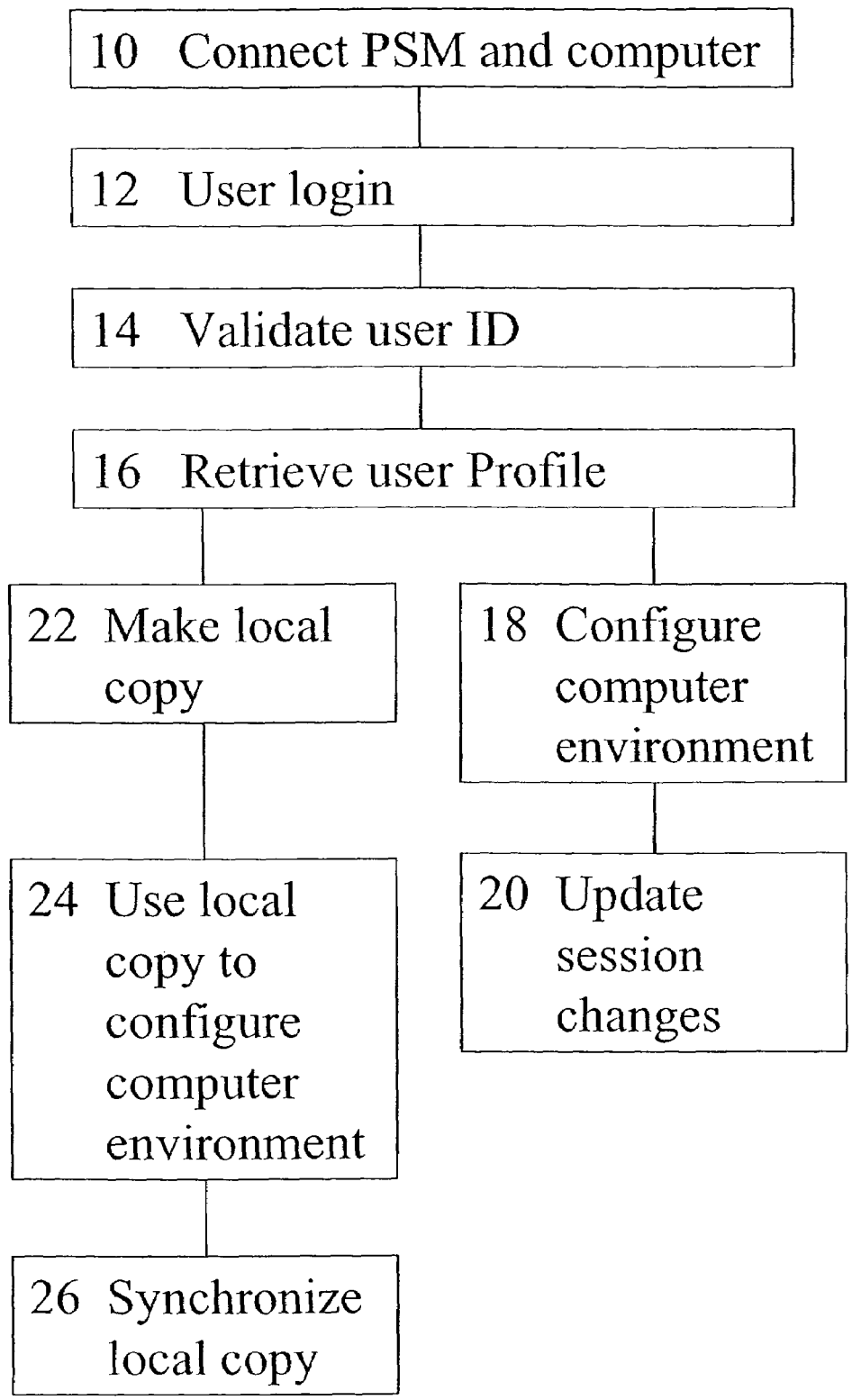
FIG. 1 is flowchart of a method to configure a computer environment of a computer system using a user profile which is stored on a portable storage medium that is operable in accordance with a preferred embodiment of the invention.

Reference is now made to FIG. 1, which is flowchart of a method to configure a computer environment of a computer system using a user profile which is stored on a portable storage medium that is operable in accordance with a preferred embodiment of the invention. For both of the above scenarios, the following steps are performed. First, the portable storage medium (PSM) is operationally connected to the computer system (block 10). Second, the user logs onto the computer system using his or her user identification (block 12). Third, the user identification (ID) is validated from a relevant user list, by the computer system (block 14). Fourth, the user profile is retrieved from the portable storage medium, by the computer system (block 16). Fifth, the computer system uses the retrieved user profile to at least partially configure a computer environment of the computer system (block 18). All changes to the user profile data within the session are updated on the portable storage medium (block 20). It should be noted that steps which are described as performed "by the computer system" are performed substantially by the operating system of the computer system. The steps are described as "substantially" performed by the operating system of the computer system as it is possible that some minor functions may be performed by software operated by the portable storage medium. For example, as will be described in more detail later, the portable storage medium may actively inform the computer system of the presence of a user list, which is stored in the portable storage medium. By way of a further example, also to be described in more detail later, the portable storage medium may request to be configured as a profile source or as a pseudo network node. By way of introduction, it is convenient to maintain a copy of the user profile in a local storage facility of the computer system. This copy is then synchronized with the user profile of the portable storage medium as necessary. The local storage facility is typically a local hard disk drive. Therefore, in accordance with an alternate embodiment of the present invention the computer system creates a copy of the user profile data in the local storage facility (block 22) The computer system uses the local copy of the user profile to at least partially configure the computer environment of the computer system (block 24). The local user profile data stored in the local storage facility and the user profile stored in the portable storage medium are synchronized when logging on to and logging off from the computer system (block 26). It should be noted that every computer system typically has a user list therein. A user list is a record, typically protected and encrypted, of known users and passwords, access rights, and optionally the locations of the corresponding user profiles. A user list may define a single user or several users. Nevertheless, the computer system's user list may not be relevant, in that the computer system's user list may not include the user who is currently logging on, for example, in the second scenario where a user is logging onto a foreign computer system. In such a case the relevant user list is typically stored in the portable storage medium. When the relevant user list is stored in the portable storage medium the computer system needs to know that the relevant user list is stored in the portable storage medium. This is discussed in more detail below.

In the first scenario, the relevant user list is stored in the computer system. The relevant user list indicates that this user's profile resides in the portable storage medium. The changes that need to be made to the operating system and environment of the computer system to enable the above steps to be performed when the user list is stored in the computer system depend on several factors. These factors include how these systems currently handle user profiles, user lists and external devices. For example, in a Microsoft Windows environment, it is typically sufficient to define the location of a user profile to be on a portable drive. If the computer system automatically assumes that any profile not resident on the local hard drive is a roaming profile, the user profile typically receives the treatment given to network roaming profiles, including saving of local copies of the user profile and automatic synchronization of the local copy and the copy stored in the portable storage medium. In addition, it should be noted that there is typically an inconsistent assigning of removable drive letters by some operating systems, for example, Microsoft Windows. For example, a flash disk that is plugged into a USB drive may be assigned different drive letters according to the state of the system. For example, the flash disk may be assigned drive D at times and drive E at others. Furthermore, on different computers systems the drive letters are often different due to different personal configurations. For example, one system's drive E is another system's drive H. It should be noted, that for network roaming profiles, this inconsistency does not exist as the path of the profile on the network server is consistent at all times and from all computers. Therefore, a consistent naming of user profiles is necessary for a successful implementation of the above method. There are several ways to enforce consistent drive naming. A first way is to reserve a fixed drive letter for removable media as is already done for floppy drives. A second way is to provide a logical drive letter or other logical address that is mapped to the correct physical drive location. Another way is through the extension of network naming which is described in detail below.

Figure 2:
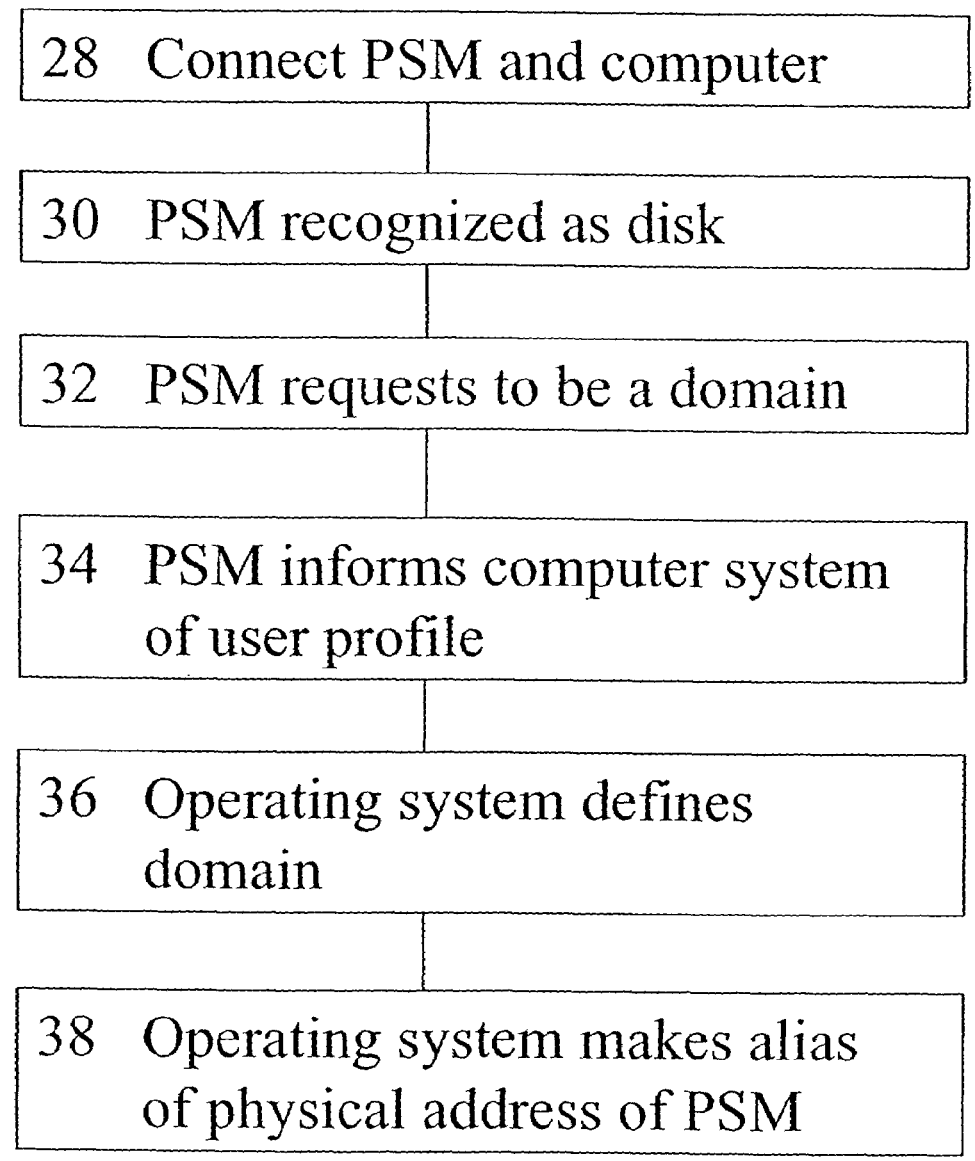
FIG. 2 is a flowchart of a method to enforce consistent drive naming for use with the method of FIG. 1.

Reference is now made to FIG. 2, which is a flowchart of a method to enforce consistent drive naming. In the second scenario, when the relevant user list is stored in the portable storage medium the computer system needs to know that the relevant user list is stored in the portable storage medium. For example, in a Microsoft Windows environment, according to the present invention the user authentication procedure is modified, as according to the prior art, the user authentication procedure only validates users that are in the user list stored in the local hard disk or network server. Therefore, according to the present invention the system is modified to enable searching for a user list on the portable storage medium and to validate usernames and passwords from that list. An elegant and convenient method to perform these modifications in Microsoft Windows and other operating environments is to extend the concept of a network and network naming to certain removable media. On a network, paths and addresses specify the network node, for example a computer, followed by the path within that node. For example, \\server\c\myfile is a path of a file on the network server, the file path being consistent from any computer on that network. In a similar manner, a portable storage medium is defined using the same naming convention, for example, \\diskonkey. A portable storage medium is named by the computer system by the following steps being performed. First, the portable storage medium is operationally connected to the computer system (block 28). Second, the portable storage medium is recognized by the computer system as a disk (block 30). Third, the portable storage medium requests, typically through its AutoPlay program, that the portable storage medium be named as a domain and network node of the computer system (block 32). The portable storage medium suggests names for the domain and the network node. Fourth, the portable storage medium informs the computer system that the portable storage medium is storing user profile data and/or a user list (block 34). Fifth, the operating system of the computer system defines the suggested name as a user domain and a network node (block 36), for example, \\diskonkey. Finally, the operating system makes the user domain and the network node an alias of the removable media physical address (block 38), for example, e:\. The above steps can be applied to both scenario one and scenario two hereinabove. These steps achieve consistent naming of the portable storage medium, both for the same computer system and for different computer systems. These steps make the operating environment aware of the user list on the portable storage medium. These steps also ensure that the operating system of the computer system sets up a new user domain for validating usernames and passwords.

Turning now to the issue of security, the use of user profiles, which are stored in a portable storage medium, naturally raise issues of security and authorization. For example, according to some embodiments of the present invention the operating environment of a computer system often creates a local copy of a roaming user profile in its local hard disk. This local copy is synchronized with the master copy, which is in the portable storage medium. This local copy is convenient if the user wants to log in and work in a familiar environment even in the absence of the portable storage medium. This is analogous to working offline in the case of network roaming profiles. However, there are circumstances where local disk mirroring is unwanted. For example, the user or the computer system may want to prohibit logging in based on username and password only, and may require the portable storage medium to be present. In this example, the portable storage medium acts as a physical key to logging on to the computer system. An additional example is the case in which the user considers the computer system to be foreign or unsafe and does not want to leave behind a copy of personal data. Another example is the case in which the encounter between the user and the computer system is a one-time event, and there is no point in utilizing local disk space for saving this user's profile. Therefore a preferred embodiment of the present invention makes two options available. The first option is that in which a user profile, which is stored in a portable storage medium, is locally mirrored, typically to be used in a familiar and trusted environment. The second option is that in which no mirroring of profiles is performed and therefore logging on to the computer system is impossible without operationally connecting the portable storage medium to the computer system. The second option is typically used in a foreign or unsafe environment. It should be noted that the second option is equivalent to preventing a copy of the user profile remaining available to the computer system after the portable storage medium and the computer system are operationally disconnected, by at least one of the computer system and the portable storage medium. Mirroring options are typically either set by the user via the user list and/or by the host computer systems administrator via operating system settings. For example, in an Internet café, it would make sense for the cafe manager to veto mirroring even if the user requests it. It will be apparent to one ordinarily skilled in the art of programming operating system software how to implement the above security features as well as the other security features described herein.

Figure 3:
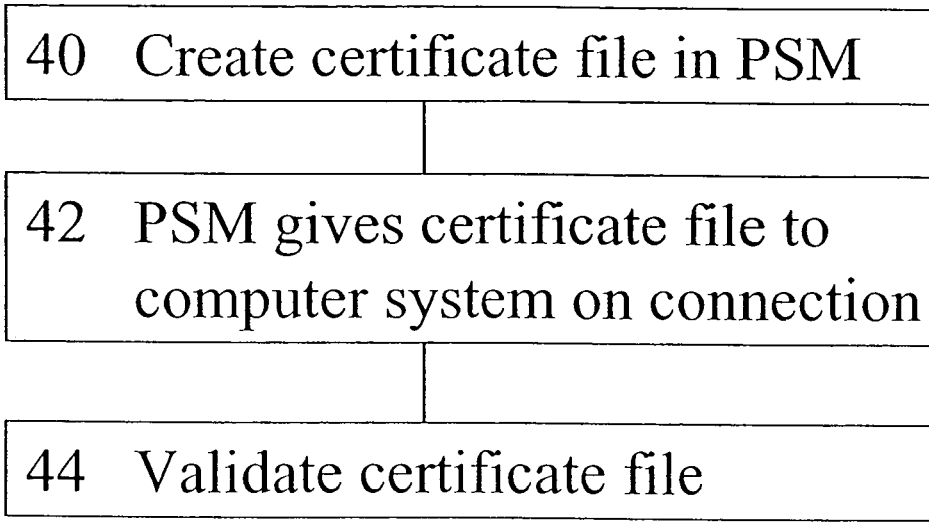
FIG. 3 is a flowchart of a method to establish an authorization scheme for use with the method of FIG. 1.
Figure 4:
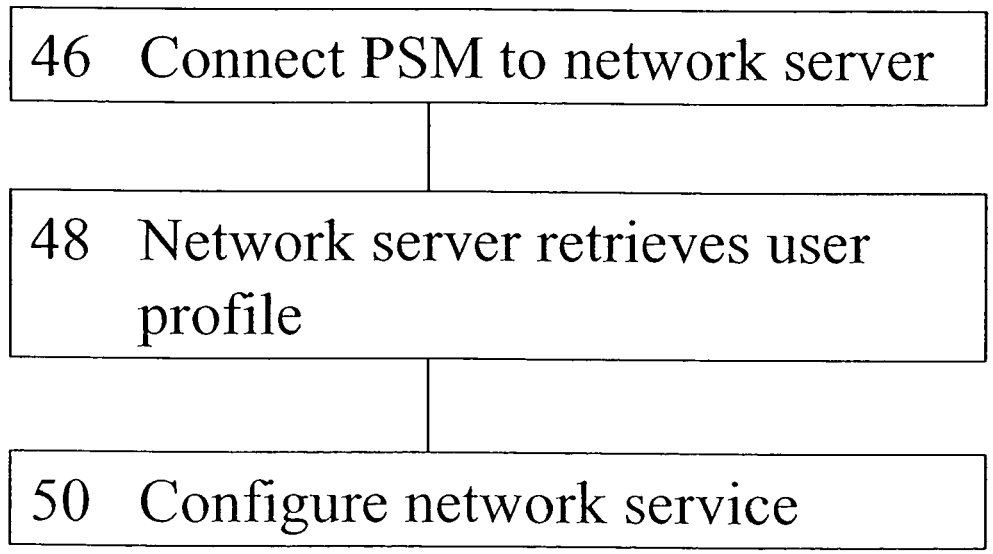
FIG. 4 is a flowchart of a method to configure an Internet service provided by a web server using a user profile which is stored on a portable storage medium that is operable in accordance with an alternate embodiment of the invention.

The procedure of portable storage medium login, described hereinabove, wherein a user logs into a computer system using a username and password, which is validated using the user's own user list that is stored in the user's portable storage medium, creates an authorization problem. Obviously, if the computer owner intended usernames and passwords to restrict access to his or her computer, this defeats his or her purpose, as the computer is completely open to users carrying portable storage medium with their own authorization. Therefore, most computer owners will choose to completely disable portable storage media login, or to restrict portable storage media login to portable storage media that are known or authorized to the computer owner via the host computer policy in relation to roaming users. Reference is now made to FIG. 3, which is a flowchart of a method to establish an authorization scheme. Typically, computer systems, which allow foreign users to login, do this as a service that is paid for or is provided for on a restricted basis, for example, for patrons of a hotel. Therefore, an authorization scheme for the creation of a foreign user domain on a computer system using a portable storage medium is required. The authorization scheme is implemented by creating a certificate file or token in the portable storage medium (block 40). The certificate is originally produced by the computer owner and given to users of his or her choice to be put in their portable storage media. When the personal storage medium is operationally connected to the computer system, the certificate is given to the computer system (block 42). The computer system grants a user domain to the portable storage medium after validating the certificate file for validity and authenticity (block 44), thereby enabling the user to use the computer system. The certificate may expire after a given time period, after a given number of logins, after a credit balance has been used or other criteria. There may be several certificates on one portable storage medium which were created by different computers. A computer owner is given an option to disable the use of this authorization scheme Reference is now made to FIG. 4, which is a flowchart of a method to configure a Internet service provided by a web server using a user profile which is stored on a portable storage medium that is operable in accordance with an alternate embodiment of the invention. Portable storage media can be used to change the interaction between a user and a web server that provides personalized services. As has been noted, the service provider stores a user's profile data in its web server. The current justification for this practice is that the user's profile data is available over the Internet from any computer system. However, as portable storage media are capable of being wherever the user is, and as they are capable of storing sizeable amounts of data, this justification no longer exists. Therefore, web service providers have a viable option for storing profile data of a user on a user's portable storage medium. Some users, for the sake of data confidentiality, integrity and availability will undoubtedly require this viable option. Therefore, according to the present invention, personalized services are provided to a user of an Internet service by the following steps. First, the portable storage medium is operationally connected to the web server via an Internet connection (block 46). Second, the network server retrieves the user profile from the portable storage medium (block 48). Third, the web server configures the Internet service using the retrieved user profile (block 50). It should be noted, that the features described hereinabove with regards to using a portable storage medium with a computer system are also applicable to using a portable storage medium with a web server, for example, the synchronization of user profile data between a portable storage medium and a web server as well as an authorization scheme using certificate files or tokens.

Microsoft's .NET platform, and particularly tools such as .NET Passport and .NET My Services, attempt to unify personalized web based services, providing a unified and centralized authorization of users and storage of web personalized data, guaranteed by a trusted agency. As many users prefer to store their own personalized data, these platforms and tools should enable users to store this data on the user's personal portable media. In addition, the procedures described hereinabove to associate a user with the user's portable storage medium, and the ability of a user to travel between computers, will enhance the adoption of the .NET platform and similar initiatives.

It will be apparent to those ordinarily skilled in the art that the methods described hereinabove, may be implemented by incorporating them into a PC operating system, a network server operating system, a web browser, a Java script, or an application program.

While the invention has been described with respect to a limited number of embodiments, it will be appreciated that many variations, modifications and other applications of the invention may be made.

What is claimed is:

1. A method to personalize a computer environment of a computer system comprising the steps of:
    (a) storing at least a portion of a user profile in a portable storage medium;
    (b) logging onto the computer system using a user identification;
    (c) validating said user identification from a relevant user list, by the computer system;
    (d) retrieving said portion from said portable storage medium, by the computer system;
    (e) at least partially configuring the computer environment of the computer system according to said portion, by the computer system; and
    (f) preventing at least a part of a copy of said portion remaining available to the computer system after said portable storage medium and the computer system are operationally disconnected, by at least one of the computer system and said portable storage medium.

2. The method according to claim 1, wherein said relevant user list is stored in the computer system.

3. The method according to claim 1, wherein said relevant user list is stored in said portable storage medium.

4. The method according to claim 3, further comprising the step of:
    (g) the computer system knowing that said relevant user list is stored in said portable storage medium.

5. The method according to claim 1, further comprising the step of:
    (g) the computer system recognizing said portable storage medium as a domain and a network node of the computer system.

6. The method according to claim 1, further comprising the step of:
    (g) the computer system knowing that said portion is stored in said portable storage medium.

7. The method according to claim 1, further comprising the steps of:
    (g) creating a copy of said portion in a local storage facility of the computer system, by the computer system; and
    (h) synchronizing said copy of said portion which is stored in said local storage facility with said portion which is stored in said portable storage medium.

8. The method according to claim 7, wherein said step of synchronizing is performed during at least one of a logging on to the computer system and a logging off from the computer system.

9. The method according to claim 1, further comprising the step of:
    (g) the computer system validating a certificate file which is stored in said portable storage medium to grant use of the computer system.

10. The method according to claim 9, wherein said certificate file expires after a predetermined time period.

11. The method according to claim 9, wherein said certificate file expires after a predetermined number of logins.

12. The method according to claim 9, wherein said certificate file expires after a prepaid cash balance is exhausted.

13. A computer system comprising:
    (a) a portable storage medium having at least a portion of a user profile stored therein; and
    (b) a processor which is configured to:
        (i) validating a user identification from a relevant user list;
        (ii) retrieve said portion from said portable storage medium; and
        (iii) update a computer environment associated with said processor according to said portion;
    wherein at least one of said processor and said portable storage medium is further configured to prevent at least a part of a copy of said portion remaining available to said processor after said portable storage medium and said processor are operationally disconnected.

14. The computer system according to claim 13, wherein said portable storage medium is configured to be reversibly operationally connected to said processor.

15. The computer system according to claim 13, wherein said processor has a local storage facility; and wherein said relevant user list is stored in said local storage facility.

16. The computer system according to claim 13, wherein said relevant user list is stored in said portable storage medium.

17. The computer system according to claim 16, wherein said portable storage medium is further configured, such that, said processor knows that said user list is stored in said portable storage medium.

18. The computer system according to claim 13, wherein said portable storage medium is configured, such that, said processor recognizes said portable storage medium as a domain and a network node of said processor.

19. The computer system according to claim 13, wherein said portable storage medium is further configured, such that, said processor knows that said portion is stored in said portable storage medium.

20. The computer system according to claim 13, wherein said processor has a local storage facility; wherein said processor is further configured to create a copy of said portion in said local storage facility; and wherein at least one of said processor and said portable storage medium is configured to synchronize said copy of said portion which is stored in said local storage facility with said portion which is stored in said portable storage medium.

21. The computer system according to claim 20, wherein at least one of said processor and said portable storage medium is further configured to synchronize said copy of said portion which is stored in said local storage facility with said portion which is stored in said portable storage medium during at least one of a logging on to said processor and a logging off from said processor.

22. The computer system according to claim 13, wherein said portable storage medium has a certificate file therein; and wherein said processor is further configured to validate said certificate file to grant use of said computer system.

23. The computer system according to claim 22, wherein said certificate file expires after a predetermined time period.

24. The computer system according to claim 22, wherein said certificate file expires after a predetermined number of logins.

25. The computer system according to claim 22, wherein said certificate file expires after a prepaid cash balance is exhausted.

26. A method to provide personalized services to a user comprising the steps of:
(a) storing at least a portion of a user profile in a portable storage medium;
(b) retrieving said portion from said portable storage medium by said web server;
(c) at least partially configuring an Internet service according to said portion by said web server; and
(d) preventing at least a part of a copy of said portion remaining available to said web server after said portable storage medium and said web server are operationally disconnected, by at least one of said web server and said portable storage medium.

27. The method according to claim 26, further comprising the steps of:
(e) creating a copy of said portion in a local storage facility of said web server, by said web server; and
(f) synchronizing said copy of said portion which is stored in said local storage facility with said portion which is stored in said portable storage medium.

28. The method according to claim 27, wherein said step of synchronizing is performed during at least one of a logging on to said web server and a logging off from said web server.

29. The method according to claim 26, further comprising the step of:
(e) said web server validating a certificate file which is stored in said portable storage medium to grant use of said web server.

30. The method according to claim 29, wherein said certificate file expires after a predetermined time period.

31. The method according to claim 29, wherein said certificate file expires after a predetermined number of logins.

32. The method according to claim 29, wherein said certificate file expires after a prepaid cash balance is exhausted.

33. A system to provide personalized services to a user comprising:
(a) a portable storage medium having at least a portion of a user profile stored therein; and
(b) a web server which is configured to retrieve said portion to personalize an Internet service;
wherein at least one of said web server and said portable storage medium is further configured to prevent at least a part of a copy of said portion remaining available to said web server after said portable storage medium and said web server are operationally disconnected.

34. The system according to claim 33, wherein said web server has a local storage facility; wherein said web server is further configured to create a copy of said portion in said local storage facility; and wherein at least one of said web server and said portable storage medium is configured to synchronize said copy of said portion which is stored in said local storage facility with said portion which is stored in said portable storage medium.

35. The system according to claim 34, wherein at least one of said web server and said portable storage medium is further configured to synchronize said copy of said portion which is stored in said local storage facility with said portion which is stored in said portable storage medium during at least one of a logging on to said web server and a logging off from said web server.

36. The system according to claim 33, wherein said portable storage medium has a certificate file therein; and wherein said web server is further configured to validate said certificate file to grant use of said web server.

37. The system according to claim 36, wherein said certificate file expires after a predetermined time period.

38. The system according to claim 36, wherein said certificate file expires after a predetermined number of logins.

39. The system according to claim 36, wherein said certificate file expires after a prepaid cash balance is exhausted.

* * * * *